(12) United States Patent
Kim

(10) Patent No.: US 12,103,606 B2
(45) Date of Patent: Oct. 1, 2024

(54) WORM WHEEL OF STEERING SYSTEM SPEED REDUCER, AND MANUFACTURING METHOD THEREFOR

(71) Applicant: HL MANDO CORPORATION, Gyeonggi-do (KR)

(72) Inventor: Jong Han Kim, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 56 days.

(21) Appl. No.: 17/640,328

(22) PCT Filed: Sep. 2, 2020

(86) PCT No.: PCT/KR2020/011736
§ 371 (c)(1),
(2) Date: Apr. 2, 2022

(87) PCT Pub. No.: WO2021/045493
PCT Pub. Date: Mar. 11, 2021

(65) Prior Publication Data
US 2022/0324509 A1   Oct. 13, 2022

(30) Foreign Application Priority Data
Sep. 3, 2019   (KR) .......................... 10-2019-018688

(51) Int. Cl.
*B62D 5/04*   (2006.01)
*B29C 45/00*   (2006.01)
(Continued)

(52) U.S. Cl.
CPC ............. *B62D 5/0454* (2013.01); *B62D 3/04* (2013.01); *F16H 1/16* (2013.01); *F16H 55/22* (2013.01);
(Continued)

(58) Field of Classification Search
CPC ...... B62D 3/04; B62D 5/0409; B62D 5/0454; F16H 1/16; F16H 55/22; F16H 2055/065;
(Continued)

(56) References Cited

U.S. PATENT DOCUMENTS

| | | | |
|---|---|---|---|
| 6,354,395 B1 * | 3/2002 | Cheng | B62D 5/0409 180/444 |
| 8,795,569 B2 * | 8/2014 | Oberle | F16H 55/06 264/261 |

(Continued)

FOREIGN PATENT DOCUMENTS

| | | | | |
|---|---|---|---|---|
| CN | 109695697 A | * | 4/2019 | ....... B29C 45/14491 |
| CN | 110682960 A | * | 1/2020 | |

(Continued)

OTHER PUBLICATIONS

International Search Report for PCT/KR2020/011736 mailed on Dec. 1, 2020 from WIPO (now published as WO 2021/045493).

(Continued)

*Primary Examiner* — Adam D Rogers
(74) *Attorney, Agent, or Firm* — Womble Bond Dickinson (US) LLP

(57) ABSTRACT

The present embodiments relate to a worm wheel of a steering system speed reducer, and provide a worm wheel of a steering system speed reducer, and a manufacturing method therefor, the worm wheel comprising: an external toothed part having a ring shape, external gear teeth provided on the outer peripheral side thereof, insertion grooves provided on the inner peripheral side thereof, and coupling holes provided on the upper surface and/or the lower surface thereof; an internal toothed part, which has a ring shape, is inserted into the external toothed part, has insertion protrusions provided on the outer peripheral side thereof, and has coupling protrusions provided at locations corresponding to the coupling holes; a hub to which a steering shaft is (Continued)

coupled; and a boss part provided between the outer peripheral side of the hub and the inner peripheral side of the external toothed part.

18 Claims, 13 Drawing Sheets

(51) Int. Cl.
*B29D 15/00* (2006.01)
*B62D 3/04* (2006.01)
*F16H 1/16* (2006.01)
*F16H 55/22* (2006.01)
*B29L 15/00* (2006.01)
*B29L 31/00* (2006.01)
*F16H 55/06* (2006.01)

(52) U.S. Cl.
CPC .......... *B29C 45/0003* (2013.01); *B29D 15/00* (2013.01); *B29L 2015/003* (2013.01); *B29L 2031/7754* (2013.01); *F16H 2055/065* (2013.01)

(58) Field of Classification Search
CPC ................ B29C 45/0003; B29D 15/00; B29L 2015/003; B29L 2031/7754
See application file for complete search history.

(56) References Cited

U.S. PATENT DOCUMENTS

| | | | | |
|---|---|---|---|---|
| 10,066,726 B2 * | 9/2018 | Ahn | .......... | B62D 5/04 |
| 10,415,683 B2 * | 9/2019 | Park | .......... | F16H 57/0498 |
| 10,421,479 B2 * | 9/2019 | Kim | .......... | B62D 5/0403 |
| 10,508,723 B2 * | 12/2019 | Kim | .......... | B62D 5/0409 |
| 10,724,620 B2 * | 7/2020 | Takeuchi | .......... | B62D 5/0454 |
| 10,738,870 B2 * | 8/2020 | Yanagisawa | .......... | B29C 45/1615 |
| 11,047,466 B1 * | 6/2021 | Kiyota | .......... | F16C 19/36 |
| 11,255,420 B2 * | 2/2022 | Ernstson | .......... | B29C 45/14491 |
| 11,338,843 B2 * | 5/2022 | Peter | .......... | B62D 5/0409 |
| 11,396,936 B2 * | 7/2022 | Cheon | .......... | B62D 3/04 |
| 11,543,011 B2 * | 1/2023 | Dieringer | .......... | B62D 5/0409 |
| 11,754,164 B2 * | 9/2023 | Koop | .......... | B29C 37/0082 74/421 R |
| 2002/0043124 A1 * | 4/2002 | Shiga | .......... | B29C 45/16 74/439 |
| 2013/0228028 A1 * | 9/2013 | Kim | .......... | B29C 45/1671 264/279 |
| 2017/0241541 A1 * | 8/2017 | Kwon | .......... | B62D 5/0409 |
| 2018/0017149 A1 | 1/2018 | Takeuchi et al. | | |
| 2021/0162639 A1 * | 6/2021 | Fujinaka | .......... | B29C 45/14336 |
| 2022/0170541 A1 * | 6/2022 | Mueller | .......... | F16H 57/0006 |
| 2024/0059346 A1 * | 2/2024 | Kim | .......... | F16H 1/16 |

FOREIGN PATENT DOCUMENTS

| | | | | |
|---|---|---|---|---|
| CN | 114776782 A | * | 7/2022 | |
| EP | 2549146 A1 | * | 1/2013 | ............ F16H 55/06 |
| EP | 2549147 A1 | * | 1/2013 | ............ F16H 55/06 |
| JP | 2516056 | | 7/1996 | |
| JP | 2009-541679 | | 11/2009 | |
| KR | 20080030814 A | * | 4/2008 | |
| KR | 101162324 B1 | * | 7/2012 | |
| KR | 10-2013-0100411 | | 9/2013 | |
| KR | 10-2017-0071648 | | 6/2017 | |
| KR | 101798906 B1 | * | 11/2017 | |
| KR | 20170138659 A | * | 12/2017 | |
| KR | 101849042 B1 | * | 4/2018 | |
| KR | 20180035450 A | * | 4/2018 | |
| KR | 10-2018-0135541 | | 12/2018 | |
| KR | 10-2019-0029208 | | 3/2019 | |
| KR | 20230058962 A | * | 5/2023 | |
| WO | WO-2017157697 A1 | * | 9/2017 | ............ F16H 55/22 |

OTHER PUBLICATIONS

Written Opinion of the International Searching Authority for PCT/KR2020/011736 mailed on Dec. 1, 2020 from WIPO (now published as WO 2021/045493).

Notice of Allowance dated Apr. 23, 2024 for Korean Patent Application No. 10-2019-0108688 and its English translation by Google Translate.

* cited by examiner

[FIG. 1]
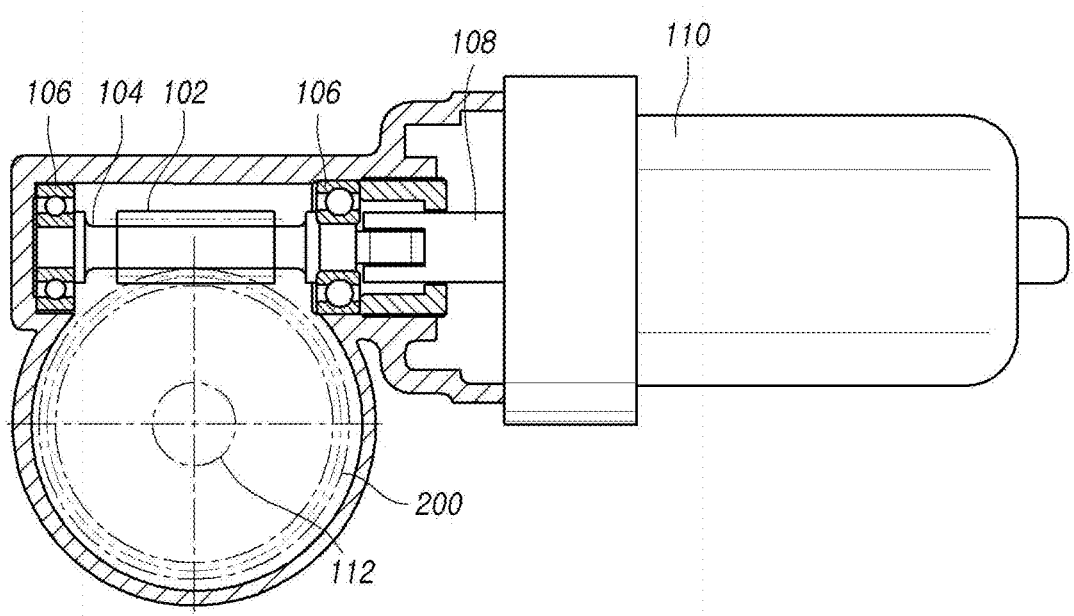

[FIG. 2]
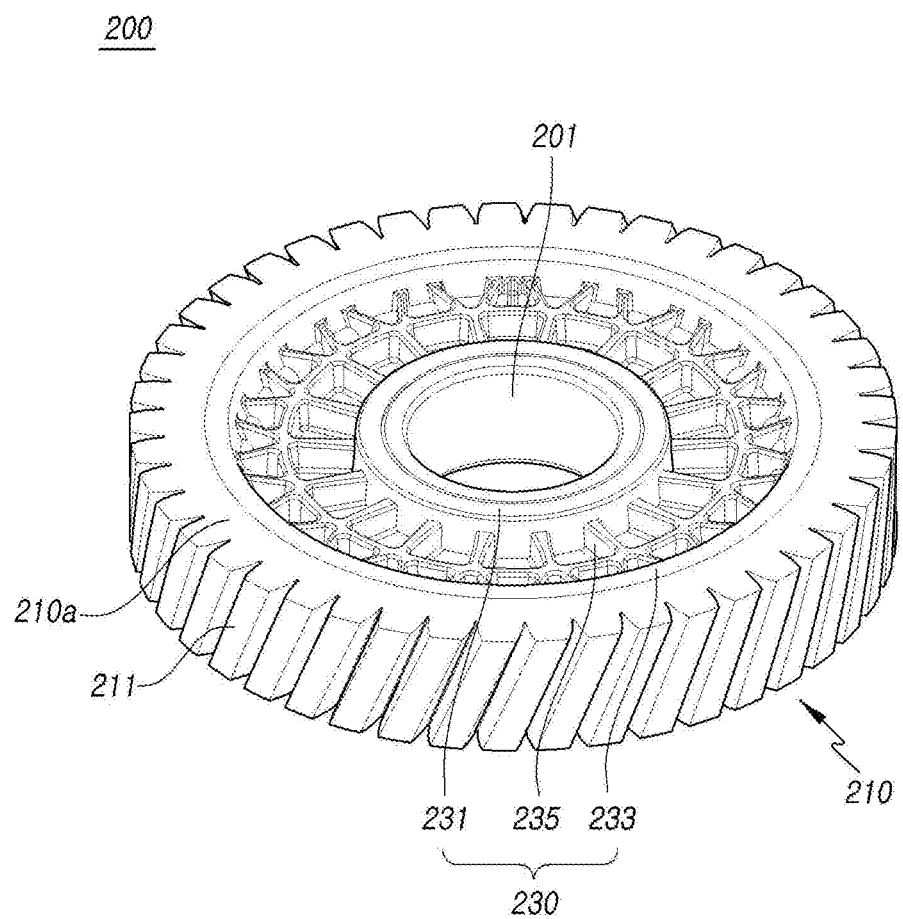

[FIG. 3]
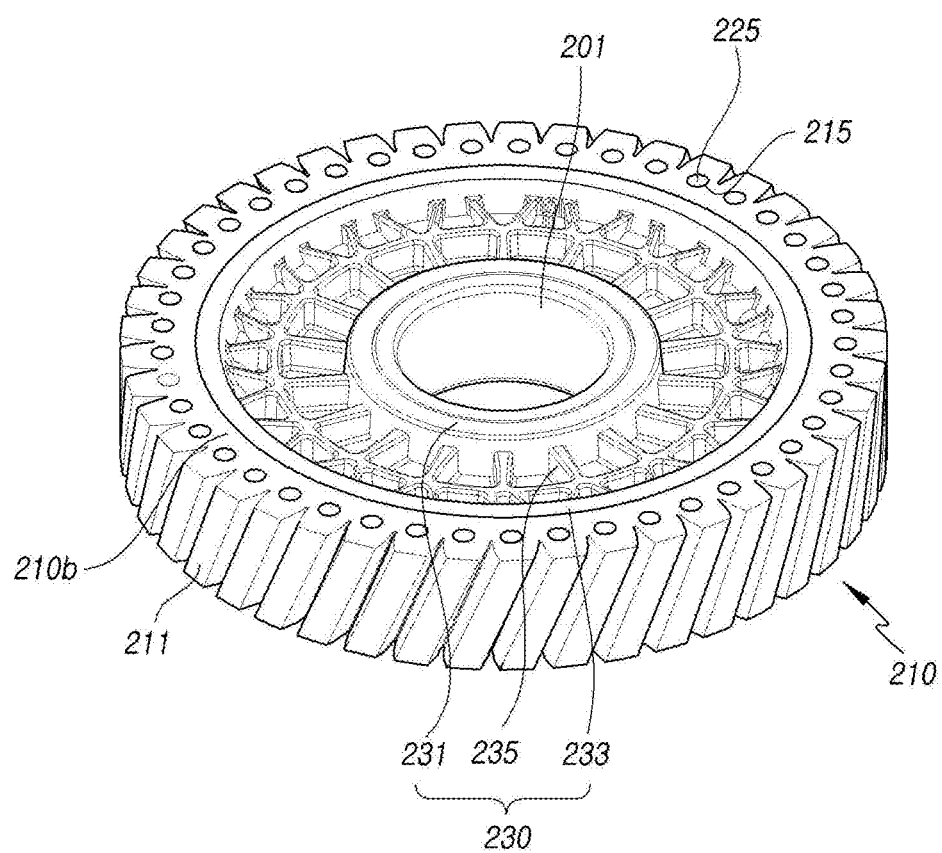

[FIG. 4]
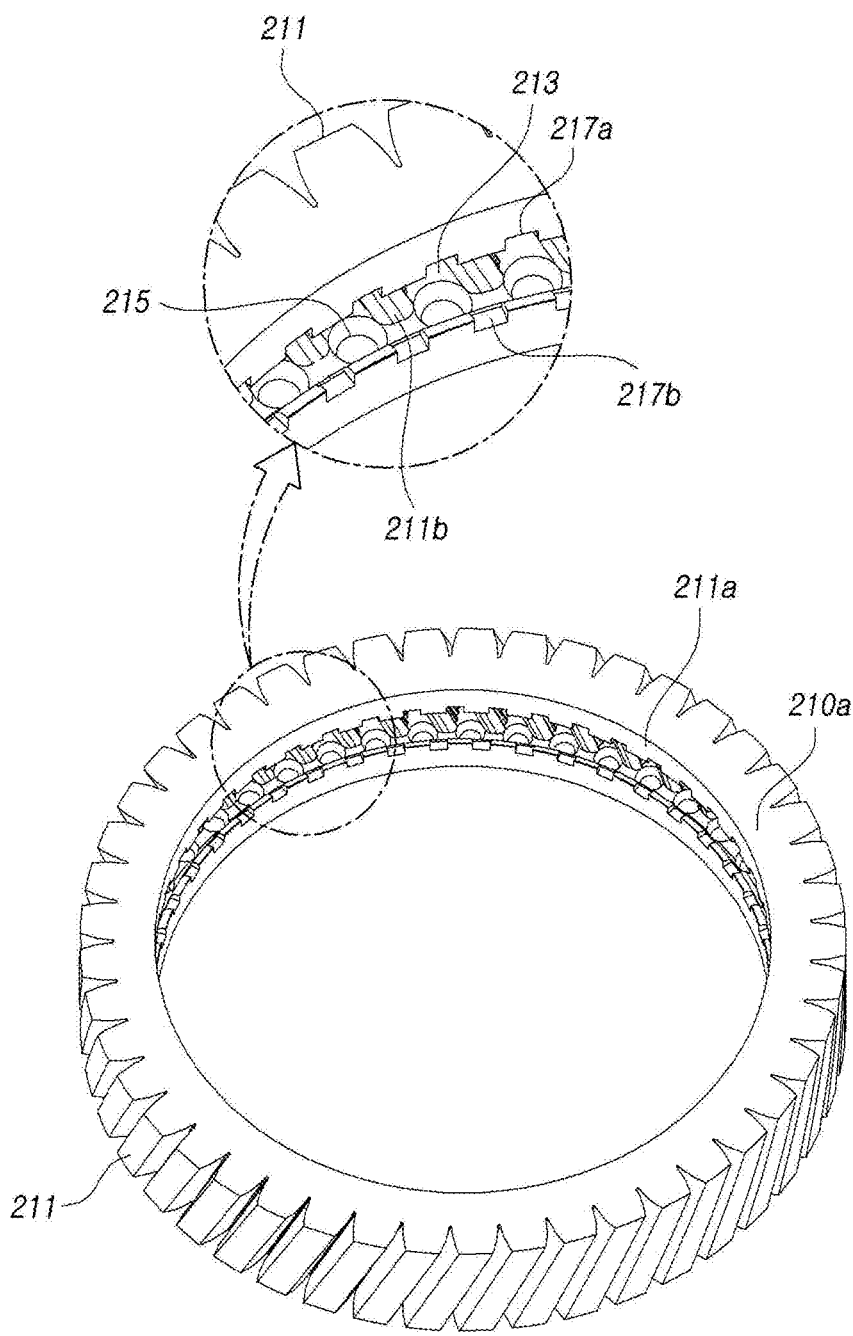

[FIG. 5]
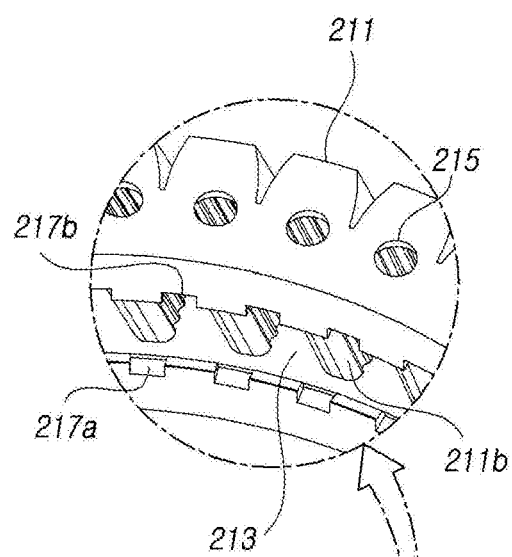
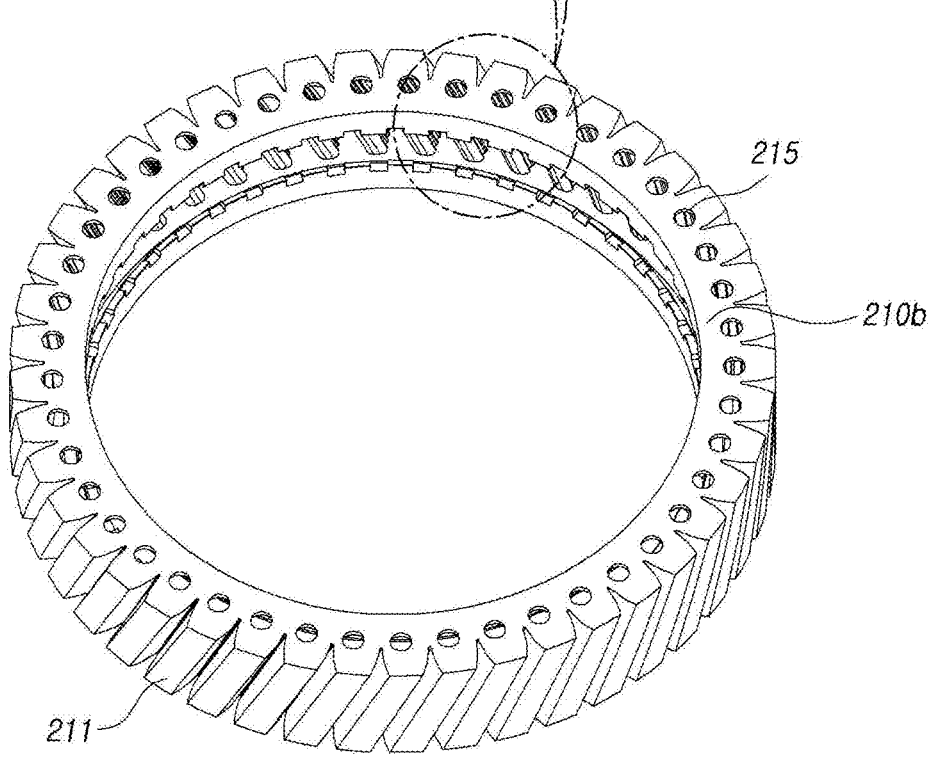

[FIG. 6]
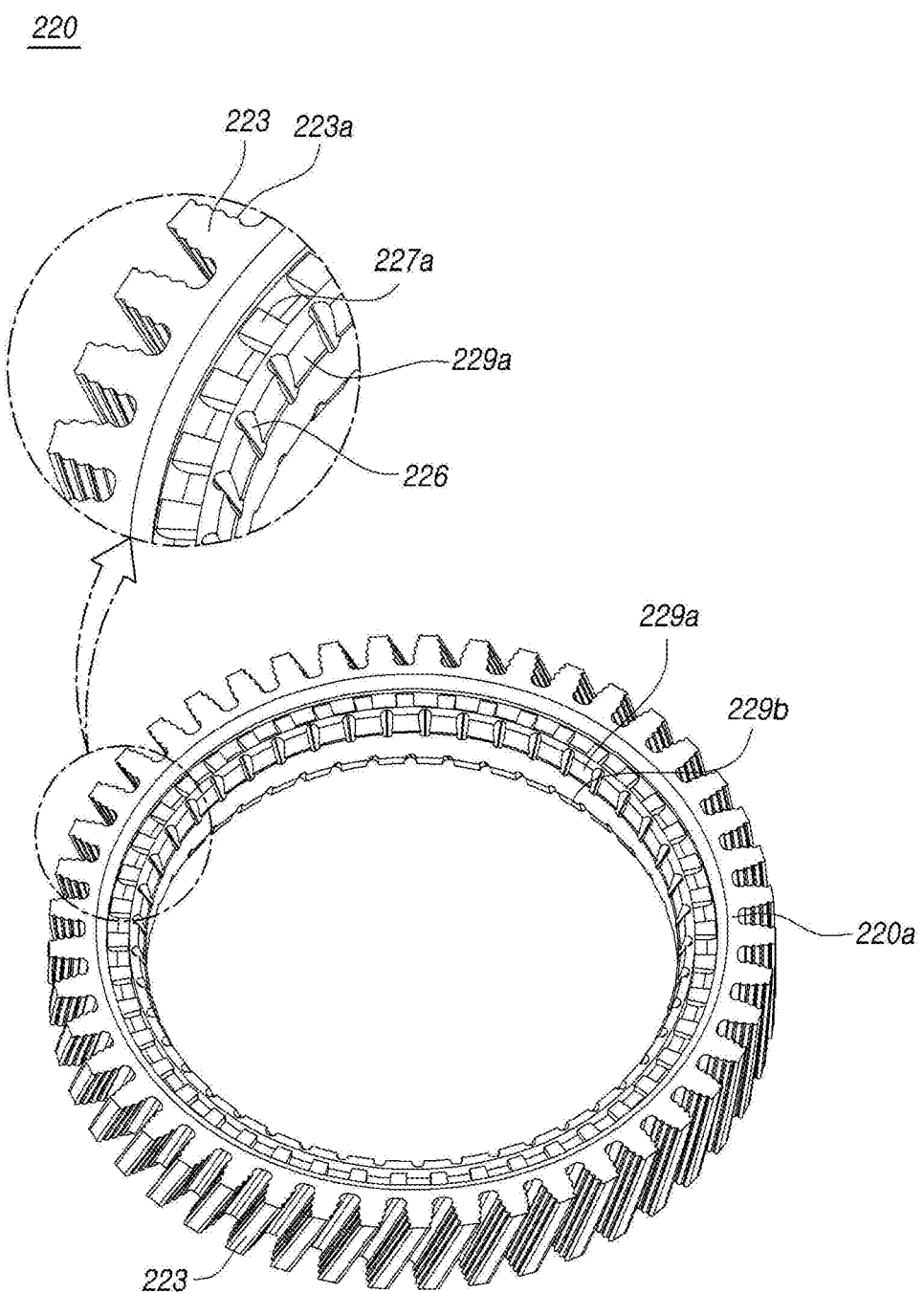

[FIG. 7]
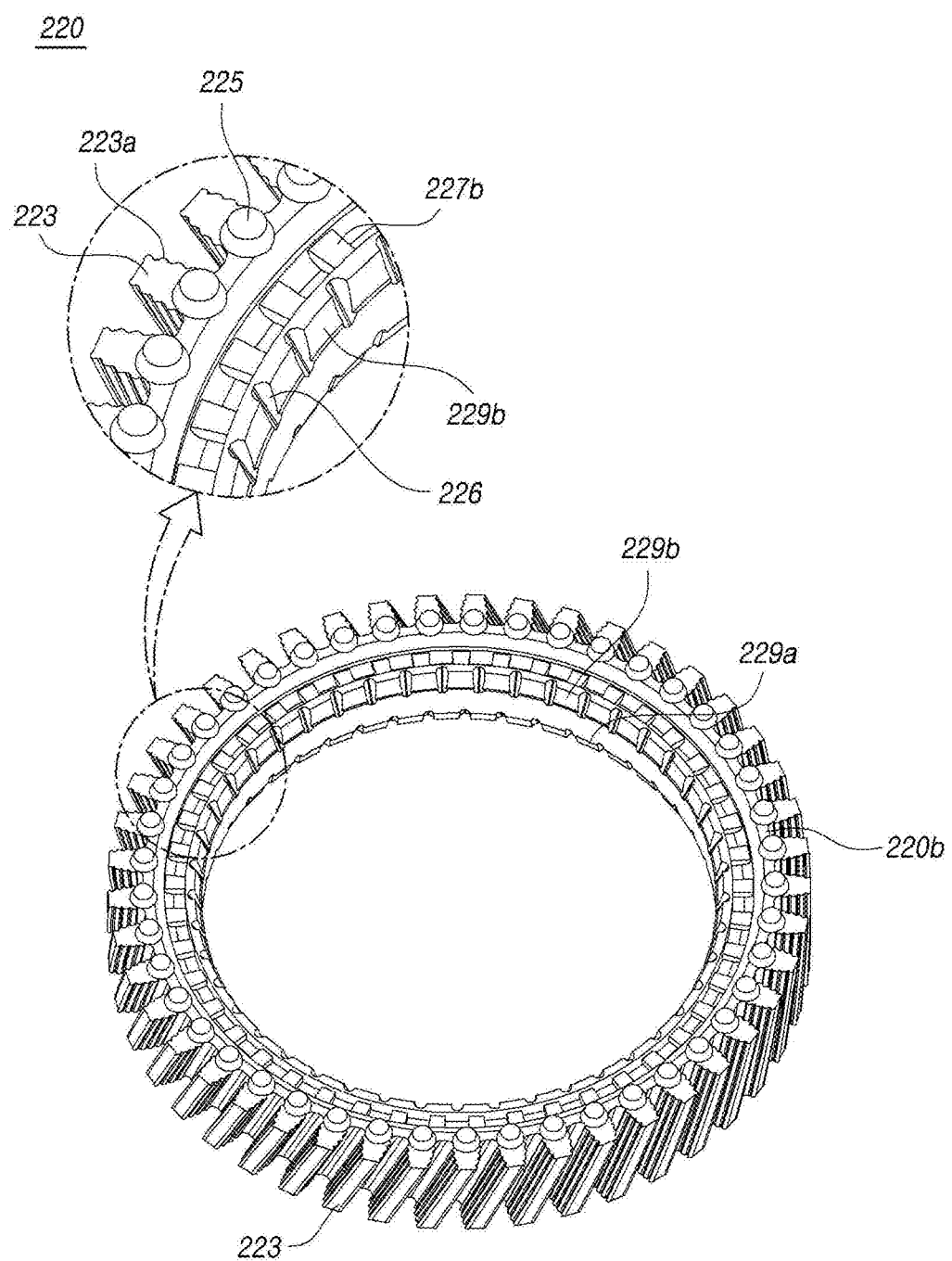

[FIG. 8]
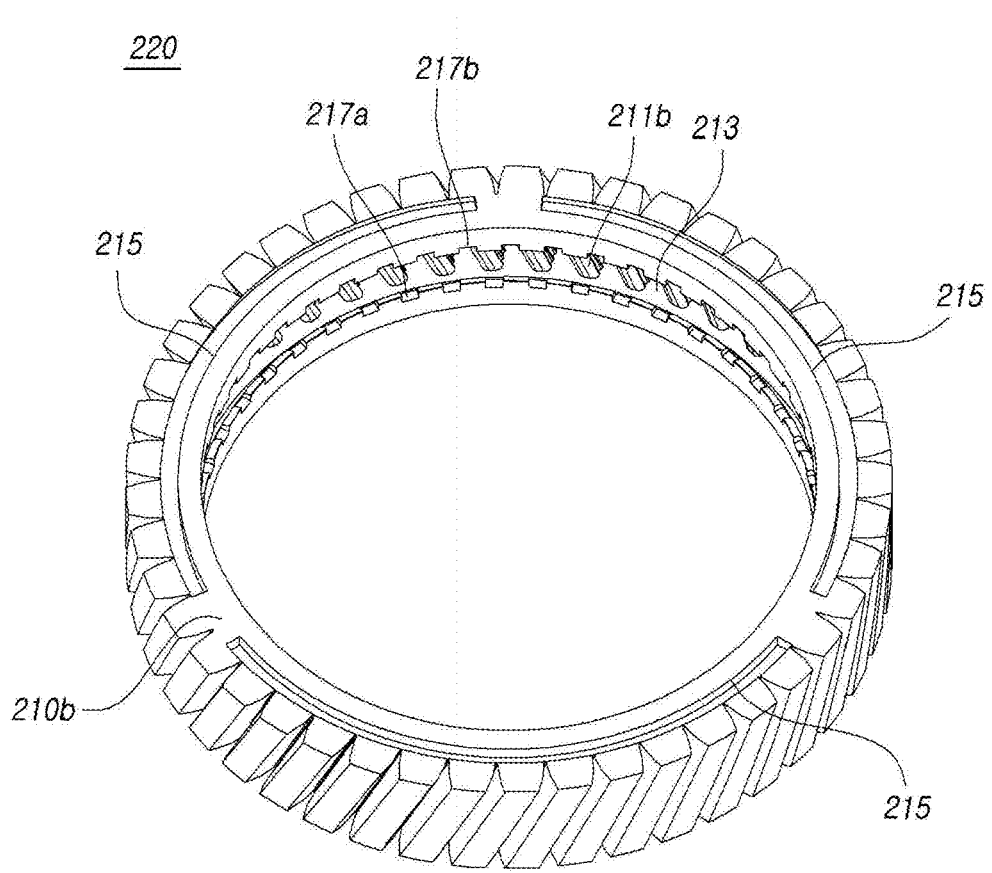

[FIG. 9]
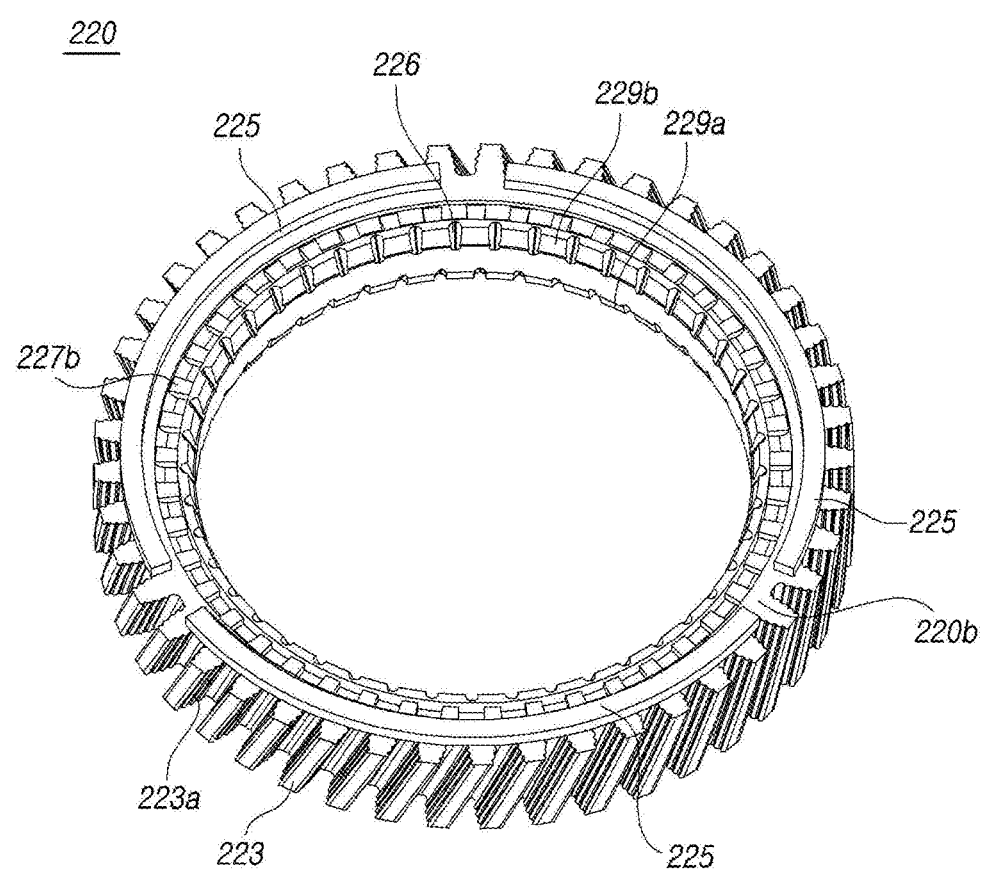

【FIG. 10】
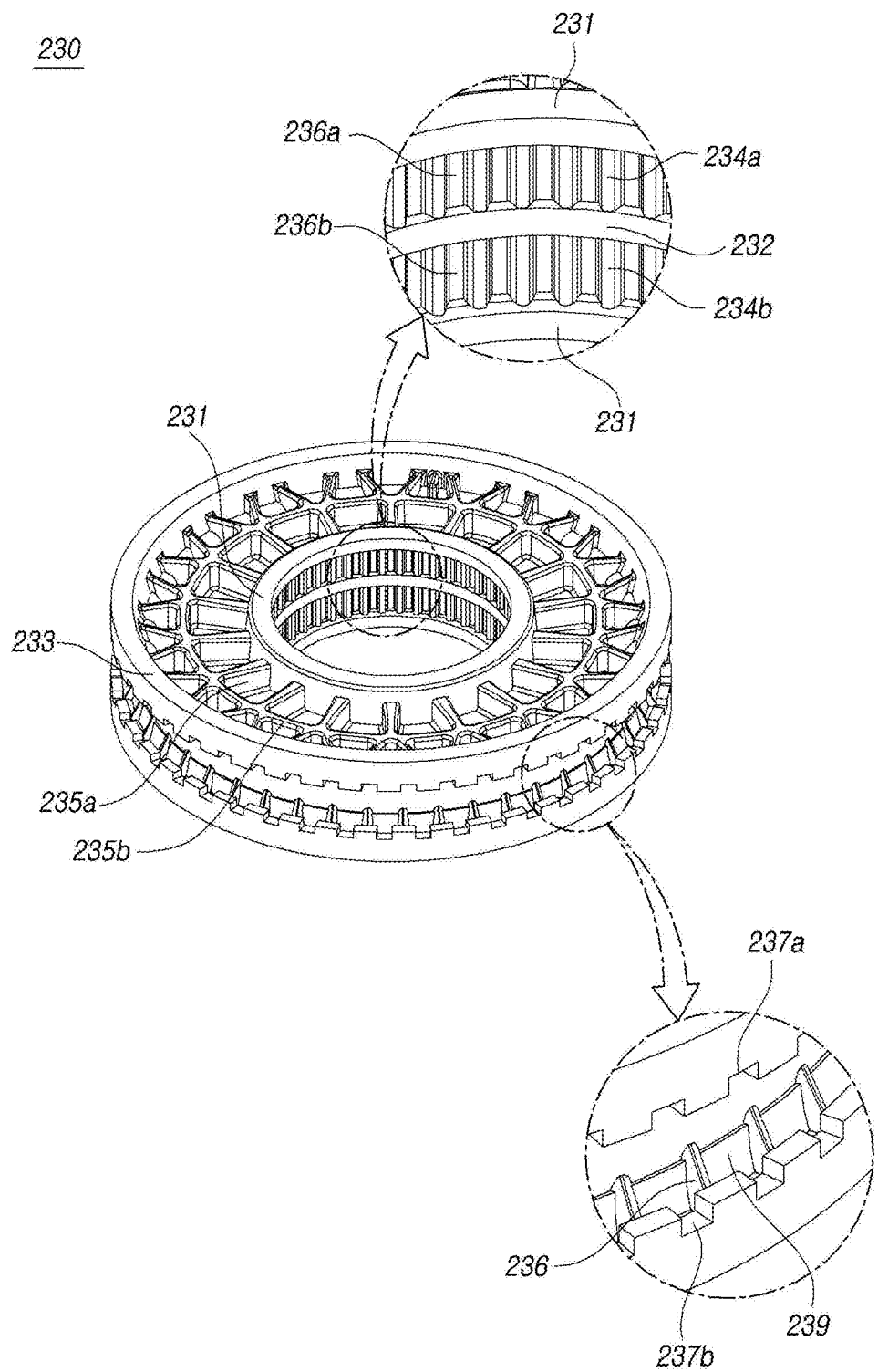

[FIG. 11]
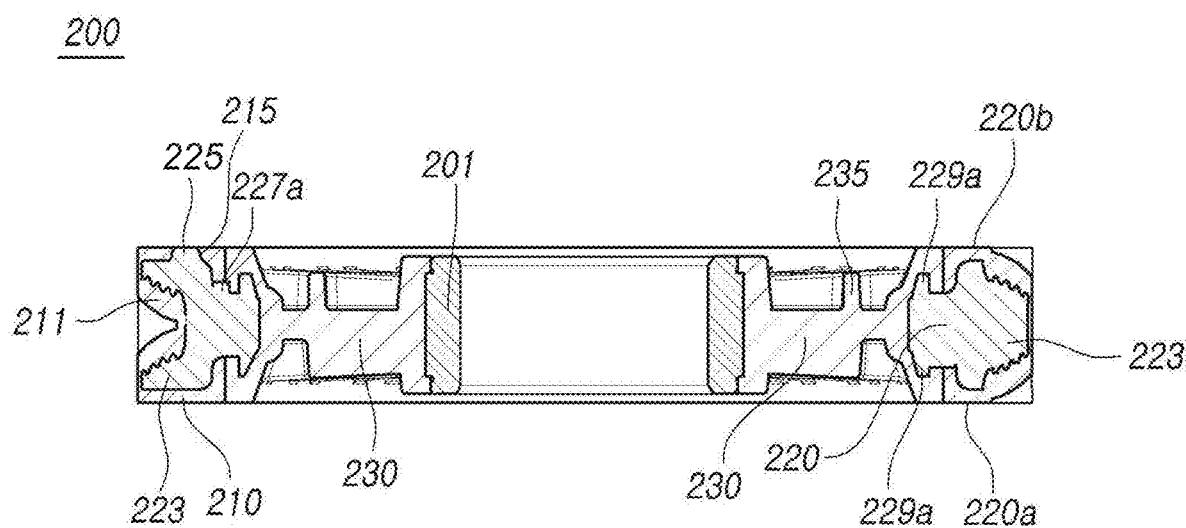

[FIG. 12]
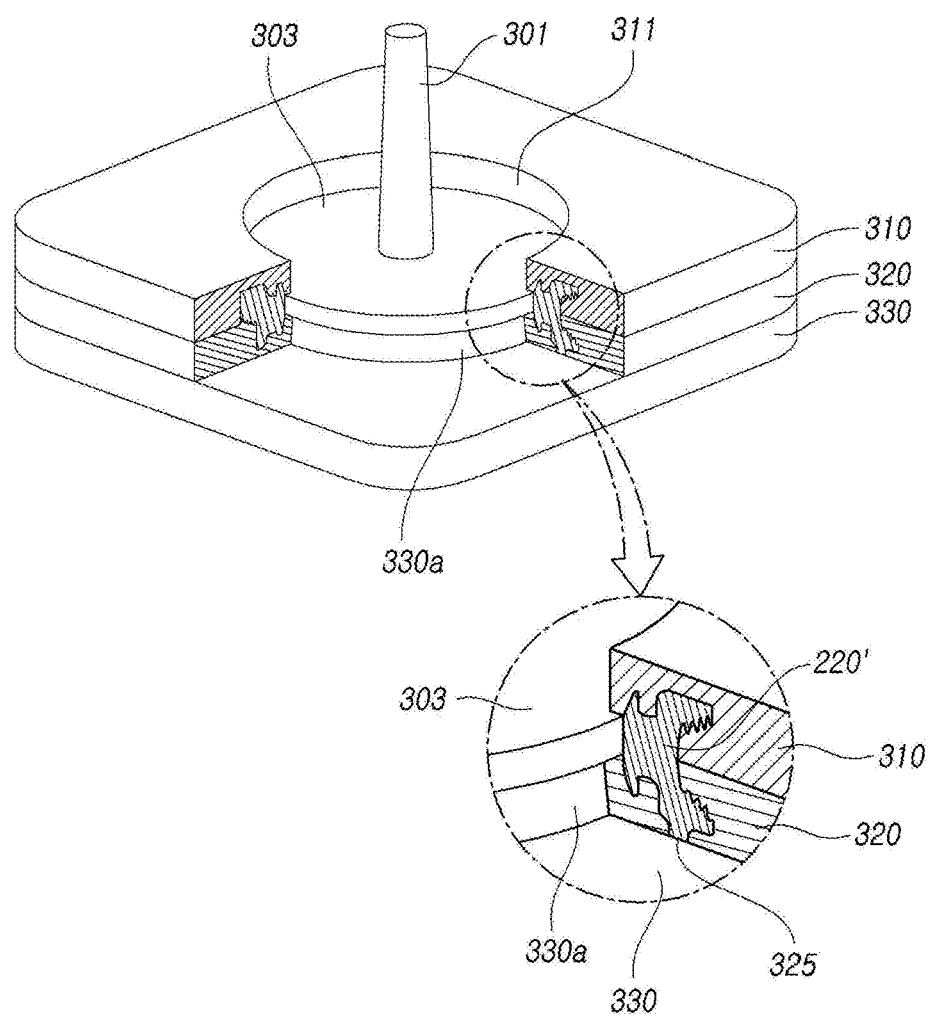

[FIG. 13]
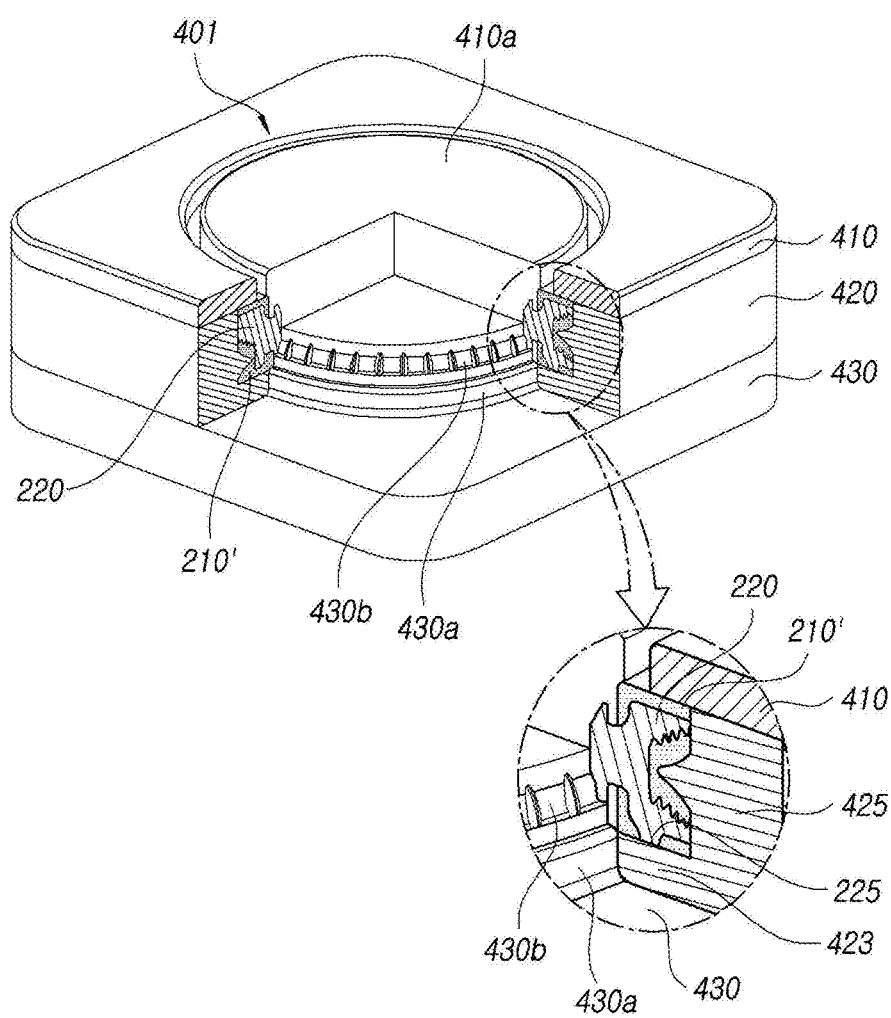

WORM WHEEL OF STEERING SYSTEM SPEED REDUCER, AND MANUFACTURING METHOD THEREFOR

CROSS-REFERENCE TO RELATED APPLICATIONS

This application is the U.S. National Stage of International Patent Application No. PCT/KR2020/011736 filed on Sep. 2, 2020, which claims priority to Korean Patent Application No. 10-2019-0108688 filed in the Korean Intellectual Property Office on Sep. 3, 2019, the disclosures of which are is incorporated by reference herein in their entireties.

TECHNICAL FIELD

The present embodiments relate to a worm wheel of a steering device reducer and a method for manufacturing the same and, more specifically, to a worm wheel of a steering device reducer and a method for manufacturing the same, which, in a worm wheel of a steering device reducer, enable the reducer to be stably used for a long time by increasing the mechanical strength of the worm wheel and durability when high power is transferred to the steering shaft through the worm wheel from the worm shaft and increasing the formability and precision of the worm wheel.

BACKGROUND ART

In general, among power assisted steering devices mounted to vehicles, an electromotive steering device adjusts the steering force by a motor, precisely drives the motor by an electronic control unit according to the vehicle driving conditions detected by various sensors, e.g., a vehicle speed sensor and a steering torque sensor, and transfers the torque generated from the motor through the reducer to the steering column or pinion, assisting the driver in manipulating the steering wheel connected to the steering column and the pinion.

Accordingly, it provides the driver with the steering performance capable of maintaining the optimal steering conditions, such as by providing a light and comfortable steering state in low-speed driving, a heavy and stable steering state in high-speed driving, and enabling quick steering in response to a sudden emergency.

Such electromotive steering devices may be divided into several types depending on the position where it is mounted. In the typical electromotive steering device, a reducer with a motor is installed in the steering column portion for fixing the steering shaft for connecting the gear box at the lower side of the vehicle and the steering wheel on the driver's seat to the vehicle body or the gear box portion embedding the pinion coupled with the rack bar, and the rotational force of the steering wheel manipulated by the driver is transferred to the rack bar by the motor and the reducer.

Here, the worm wheel of the steering device reducer plays a role to reduce the rpm of the motor and transfers it to the steering shaft and, by having a structure of being engaged and coupled with the worm shaft and the motor shaft, delivers significant vibration and noise generated by its rotation directly to the driver and degrades the durability of the internal components of the reducer or may even damage components.

Particularly while the vehicle travels on a bumpy road, an instantaneous rise occurs in the load transferred from the wheels through the rack bar and the steering shaft is instantly increased, further worsening the vibration and noise generated from the reducer and resultantly causing inconvenience to the driver.

DETAILED DESCRIPTION OF THE INVENTION

Technical Problem

The present embodiments have been conceived in the foregoing background, aiming to, in a worm wheel of a steering device reducer, enable the reducer to be stably used for a long time by increasing the mechanical strength of the worm wheel and durability when high power is transferred to the steering shaft through the worm wheel from the worm shaft and increasing the formability and precision of the worm wheel.

Technical Solution

To achieve the foregoing objectives, the present embodiments provide a worm wheel of a steering device reducer, comprising an outer toothed part having a ring shape provided with outer gear teeth engaged with gear teeth of a worm shaft on an outer circumferential side thereof and insertion recesses radially depressed and circumferentially spaced apart from each other on an inner circumferential side thereof and having a coupling hole in any one of an upper surface and lower surface thereof, an inner toothed part having a ring shape inserted into an inside of the outer toothed part and provided with insertion protrusions fitted into the insertion recesses, on an outer circumferential side thereof and a cylindrical coupling protrusion in a position corresponding to the coupling hole to be coupled to the coupling hole, a hub to which a steering shaft is coupled, and a boss part provided between an outer circumferential side and an inner circumferential side of the outer toothed part.

The present embodiments also provide a method for manufacturing a worm wheel of an electromotive steering device, forming an inner toothed part, which has insertion protrusions radially formed on an outer circumferential side thereof and fixing protrusions radially formed on an inner circumferential side thereof and a coupling protrusion formed in an upper or lower direction thereof, by stacking, one over another, an upper plate mold formed with a space for receiving an upper end of the inner toothed part, a middle plate mold formed with a space formed to receive a lower end of the inner toothed part and a through hole penetrating a lower surface to form the coupling protrusion, and a lower plate mold tightly contacting a lower surface of the middle plate mold to close the through hole, and filling the space and the through hole with a plastic resin.

Advantageous Effects

By the present embodiments, in a worm wheel of a steering device reducer, it is possible to enable the reducer to be stably used for a long time by increasing the mechanical strength of the worm wheel and durability when high power is transferred to the steering shaft through the worm wheel from the worm shaft and increasing the formability and precision of the worm wheel.

BRIEF DESCRIPTION OF THE DRAWINGS

FIG. 1 is a cross-sectional view illustrating an internal structure of a steering device reducer according to the present embodiments;

FIGS. 2 and 3 are perspective views illustrating a worm wheel of a steering device reducer according to the present embodiments;

FIGS. 4 to 10 are perspective views illustrating part of a worm wheel of a steering device reducer according to the present embodiments;

FIG. 11 is a cross-sectional view illustrating a worm wheel of a steering device reducer according to the present embodiments; and FIGS. 12 and 13 are views schematically illustrating a method for manufacturing a worm wheel of a steering device reducer according to the present embodiments.

MODE FOR CARRYING OUT THE INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

FIG. 1 is a cross-sectional view illustrating an internal structure of a steering device reducer according to the present embodiments. FIGS. 2 and 3 are perspective views illustrating a worm wheel of a steering device reducer according to the present embodiments. FIGS. 4 to 10 are perspective views illustrating part of a worm wheel of a steering device reducer according to the present embodiments. FIG. 11 is a cross-sectional view illustrating a worm wheel of a steering device reducer according to the present embodiments. FIGS. 12 and 13 are views schematically illustrating a method for manufacturing a worm wheel of a steering device reducer according to the present embodiments.

First referring to FIG. 1, a steering device reducer according to the present embodiments has a metallic worm shaft 104 formed with a worm 102 and is structured so that worm bearings 106 are respectively installed on two opposite ends of the worm shaft 104 to support the worm shaft 104, and the worm shaft 104 and a motor shaft 108 are connected to each other so that the motor 110 is driven to rotate the worm shaft 104.

To be engaged with the gear teeth 102 formed in the middle of the worm shaft 104, as a reducer, a worm wheel 200 formed of, e.g., a plastic resin composition, is provided on a side of the outer diameter of the gear teeth 102 of the worm shaft, and the worm wheel 200 is mounted on the steering shaft 112, which transfers the rotational force of the steering wheel (not shown) manipulated by the driver, to transfer the rotational force of the worm shaft 104 by the driving of the motor 110 to the steering shaft 112. Th worm wheel 200 and the worm shaft 104, engaged to each other in a worm gear manner, are mounted inside a housing 116 to be protected from the outside.

According to the driving conditions of the vehicle, an electronic control unit (not shown) provided in the vehicle controls the driving of the motor 110, and the rotational force of the worm shaft 104 by the driving of the motor 110 is added to the rotational force of the steering wheel manipulated by the driver and is transferred to the steering shaft 112, allowing the driver's steering to remain smooth and stable.

Such worm wheel 200 of the steering device reducer plays a role to reduce the rpm of the motor and transfers it to the steering shaft 112.

Meanwhile, the steering shaft, which transfers the rotational force of the steering wheel when the driver manipulates the steering wheel to the rack bar, is connected from the steering wheel through the column and universal joint to the gear box having the rack gear and the pinion gear, and the reducer may be coupled to the pinion shaft or steering shaft mounted in the gear box and column.

Accordingly, if the worm shaft 104 is rotated by the driving of the motor, the worm wheel 200 is rotated in conjunction therewith and, at this time, the worm wheel 200 is coupled to the steering shaft of the column or the pinion shaft of the gear box to assist the driver's steering force.

Here, the worm wheel 200 of the steering device reducer includes an outer toothed part 210, an inner toothed part 220, a hub 201, and a boss part 230. The outer toothed part 210 is shaped as a ring and has outer gear teeth 211 on the outer circumferential side to be engaged with the gear teeth 102 of the worm shaft 104 and insertion recesses 213, depressed radially and circumferentially spaced apart, on the inner circumferential side. The outer toothed part 210 has coupling holes 215 in at least one of the upper surface and lower surface. The inner toothed part 220 is shaped as a ring to be inserted into the outer toothed part 210. The inner toothed part 220 has insertion protrusions on the outer circumferential side to be inserted into the insertion recesses 213 and has cylindrical coupling protrusions 225 formed in the positions corresponding to the coupling holes 215 and fitted into the coupling holes 215. The steering shaft is coupled to the hub 201. The boss part 230 is provided between the outer circumferential side of the hub 201 and the inner circumferential side of the outer toothed part 210.

The insertion recess 213 in the outer toothed part 210 is formed by being radially depressed from the inner circumferential surface 211a of the outer toothed part 210 and is provided in each of the positions corresponding to the outer gear teeth 211, so that the insertion protrusion 223 of the inner toothed part 220 is inserted into the insertion recess 213, forming the outer gear tooth 211 with a predetermined thickness, on the outer side of the insertion protrusion 223.

The insertion recess 213 is shaped to tightly contact the insertion protrusion 223 due to an inner barrier 211b forming the inner thickness between the outer toothed part 210, and the inner barrier 211b may have a shape corresponding to an axial protrusion 233a provided on the outer circumferential surface of the insertion protrusion 223.

The coupling hole 215 formed vertically in the axial direction of the outer toothed part 210 may be formed in at least one of the upper surface 210a and the lower surface 210b of the outer toothed part 210. In the present embodiments, an example in which the coupling hole 215 is formed in the lower surface 210b of the outer toothed part 210 is illustrated. A plurality of coupling holes 215 may be provided to be spaced apart in the circumferential direction of the outer toothed part 210.

The coupling protrusion 225 formed in the inner toothed part 220 may be formed on at least one of the upper end 220a and the lower end 220b of the inner toothed part 220 and may protrude in a pillar shape, as shown in FIG. 7, or in an arc shape, as shown in FIG. 9, in the position corresponding to the coupling hole 215.

The outer circumferential surface of the coupling protrusion 225 and the inner circumferential surface of the coupling hole 215 are brought in tight contact with each other integrally without leaving a gap, and an end of the coupling protrusion 225 is formed to be positioned on the same plane as the upper surface 210a or lower surface 210b of the outer toothed part 210 provided with the coupling hole 215.

Accordingly, as shown in FIG. 5, when a plurality of coupling holes 215 formed in a cylindrical shape are spaced apart circumferentially on the upper surface or lower surface of the outer toothed part 210, the coupling protrusion 225 is also formed to protrude in a pillar shape corresponding to the coupling hole 215 of FIG. 7.

Further, when a plurality of coupling holes 215 formed in an arc shape are spaced apart circumferentially on the upper surface or lower surface of the outer toothed part 210 as shown in FIG. 8, the coupling protrusion 225 is also formed to protrude in the arc shape corresponding to the coupling hole 215 of FIG. 9.

In this case, the outer circumferential surface of the arc-shaped coupling protrusion 225 and the inner circumferential surface of the coupling hole 215 are also brought in tight contact with each other, and an end of the coupling protrusion 225 is formed to be positioned on the same plane as the upper surface 210a or lower surface 210b of the outer toothed part 210 provided with the coupling hole 215.

The coupling hole 215 of the outer toothed part 210, formed in a cylindrical or arc shape is formed to communicate with the insertion recess 213 formed in the upper and lower directions of the central axis and formed in the outer circumferential surface of the outer toothed part 210.

Accordingly, the coupling of the outer toothed part 210 and the inner toothed part 220, which are engaged with the gear teeth 102 of the worm shaft 104 to receive load, are secured, and twist deformation due to the transferred torque load is reduced. In particular, the twist deformation at the upper and lower portions of the insertion protrusion 223 and the outer gear teeth 211 on which the transferred load is concentrated may be minimized.

Further, the outer toothed part 210 has support recesses 217a and 217b in the inner circumferential surface of the portion connected with the insertion recess 213. The support recesses 217a and 217b may be formed on at least one of the upper side and lower side of the insertion recess 213 and, in the present embodiments, it is illustrated that the upper support recess 217a and the lower support recess 217b are formed on both the sides.

When the upper support recess 217a and the lower support recess 217b are formed on both the sides, they may be formed in staggered positions from each other in the circumferential surface on the inner circumferential surface of the outer toothed part 210.

The inner toothed part 220 inserted into the outer toothed part 210 is formed with support protrusions 227a and 227b, which protrude upward to fit into the support recesses 217a and 217b of the outer toothed part 210, on the upper surface or lower surface adjacent to the inner circumferential surface.

As such, as the support protrusions 227a and 227b of the inner toothed part 220 are fitted into the support recesses 217a and 217b of the outer toothed part 210, the deformation of the outer toothed part 210 and the inner toothed part 220 due to rotational load when the worm wheel 200 rotates may be reduced while the rigidity may be maintained.

The support recesses 217a and 217b may be formed on the upper side and lower side, respectively, connected to the insertion recesses 213. A plurality of support recesses 217a and 217b may be spaced apart circumferentially. The support protrusions 227a and 227b may be formed in the positions corresponding to the support recesses 217a and 217b on each of the upper surface and lower surface adjacent to the inner circumferential surface of the inner toothed part 220.

Further, the inner toothed part 220 is formed with fixing protrusions 229a and 229b formed as inclined surfaces, at at least one of the upper end and lower end of the inner circumferential surface.

The fixing protrusions 229a and 229b are formed as inclined surfaces which are inclined in upper and lower directions of the central axis in the center of the inner circumferential surface of the inner toothed part 220 and are formed to be radially connected with the support protrusions 227a and 227b. The fixing protrusions 229a and 229b are formed with a plurality of fixing recesses 226 spaced apart circumferentially.

The fixing protrusions 229a and 229b may be formed on at least one of the upper side and lower side of the inner circumferential surface. In the present embodiments, an example is illustrated where the upper fixing protrusion 229a and the lower fixing protrusion 229b are formed on both the sides.

The fixing protrusions 229a and 229b and the fixing recesses 226 are inserted, supported, and coupled to the outer ring part 233 of the boss part 230.

The boss part 230 is integrally formed as ribs 235 including radial ribs 235a and circumferential ribs 235b are connected between the inner ring part 231 and the outer ring part 233. The outer ring part 233 is formed with receiving parts 239 engaged with the fixing protrusions 229a and 229b of the inner toothed part 220, and receiving protrusions 236 fitted into the fixing recesses 226 are formed circumferentially between the receiving parts 239 to be supported and coupled with the inner toothed part 220.

As the coupling recesses 237a and 237b to which the support protrusions 227a and 227b of the inner toothed part 220 are fitted are formed on the upper side and lower side of the receiving parts 236 so that the deformation due to the rotational load of the inner toothed part 220 is reduced while the rigidity is maintained.

Further, the inner ring part 231 is formed with a ring-shaped separation ring 232 to separate it into upper and lower parts to have upper protrusions 234a and lower protrusions 234b, respectively, and upper recesses 236a and lower recesses 236b, respectively, which are circumferentially spaced apart from each other and is thus supported and coupled with the hub 201 having the corresponding shape formed on the outer circumferential surface.

Meanwhile, referring to FIGS. 12 and 13 together with FIGS. 1 to 11, the present embodiments provide a method for manufacturing a worm wheel of an electromotive steering device, which forms an inner toothed part 220 by stacking an upper plate mold 310 formed with a space to receive an upper end of the inner toothed part 220 having insertion protrusions 223 radially formed on the outer circumferential side, fixing protrusions 229a and 229b radially formed on the inner circumferential side, and coupling protrusions 225 formed in upper and lower directions, a middle plate mold 310 having a space formed to receive a lower end of the inner toothed part 220 and a through hole 325 penetrating a lower surface to form the coupling protrusions 225, and a lower plate mold 330 tightly contacting a lower surface of the middle mold plate 320 to close the through hole 325 and filling a space 220' where the inner toothed part 220 is formed and the through hole 325 with a plastic resin.

As described above, the inner toothed part 220 is provided with the insertion protrusions 223 radially formed on the outer circumferential side, the fixing protrusions 229a and 229b radially formed on the inner circumferential side, and coupling protrusions 225 and support protrusions 227a and 227b formed in the upper and lower directions, and the upper plate mold 310 has a space to receive the upper end of the inner toothed part 220.

The middle plate mold 320 has a space formed to receive the lower end of the inner toothed part 220 and the through hole 325 penetrating the lower surface to form the coupling protrusions 225.

The upper plate mold 310 and the middle plate mold 320 are stacked one over the other, and a cylindrical open hole 311 is formed in the center thereof to communicate with the space 220' where the inner toothed part is formed so that the molten resin 303 injected through a gate 301 is introduced through the open hole 311 into the empty space 220'.

In the center of the lower plate mold 330 tightly contacting the lower surface of the middle plate mold 320 to close the through hole 325 is formed a protruding end 330a so that the upper plate mold 310, the middle plate mold 320, and the lower plate mold 330 are stacked and coupled one over another, and the space 220' where the inner toothed part 220 is formed and the through hole 325 are filled with the plastic resin, thereby forming the inner toothed part 220.

A plurality of through holes 325 which are circumferentially spaced apart from each other may be formed, in the lower surface of the middle plate mold 320, in a cylindrical shape to form a plurality of cylindrical coupling protrusions 225 circumferentially spaced apart from each other in the inner toothed part 220 or in an arc shape to form a plurality of arc-shaped coupling protrusions 225 circumferentially spaced apart from each other in the inner toothed part 220.

If the inner toothed part 220 is so formed, the outer toothed part 210 is formed on the outer side of the inner toothed part 220. The inner toothed part 220 is seated in a toothed part mold 420 having a lower receiving part 423 and a side receiving part 425 stepped from each other, such that the coupling protrusions 225 of the inner toothed part 220 are supported on the lower receiving part 423, and the insertion protrusions 223 are spaced apart from the side receiving part 425.

The upper plate mold 410 and the lower plate mold 430, respectively, are stacked on and under the toothed part mold 420, and the space between the lower receiving part 423 and side receiving part 425 and the inner toothed part 220 is filled with the plastic resin, forming the outer toothed part 210.

The upper plate mold 410 and the toothed part mold 420 have the cylindrical open hole in the center, and the open hole is formed to communicate with the space 210' where the outer toothed part 210 is formed.

In the center of the lower plate mold 430 stacked in tight contact on the lower surface of the toothed part mold 420 is formed the protruding end 430a inserted into the open hole of the toothed part mold 420. At the outer circumferential side of the protruding end 430a are formed recesses and protrusions 430b to form the protrusions and recesses provided on the inner circumferential surface of the outer toothed part 210.

On the protruding end 430a is stacked and coupled an upper center mold 410a coupled to have a gap 410 radially from the upper mold 410. The molten resin injected through the gap 410 fills the space 210' where the outer toothed part 210 is formed, forming the outer toothed part 210.

If the outer toothed part 210 is so formed outside the inner toothed part 220, the hub 201 and the boss part 230 are formed with a mold for forming the boss part 230, and the worm wheel 200 is thus formed. A manufacturing method for forming the boss part 230 is well known, and is not described in detail.

Such a worm wheel may be molded by injecting polyamide (PA) resin among plastic resins. The polyamide resin may be formed of any one of polyamide 6, polyamide 66, polyamide 46, and polyamide 12, and may be mixed and reinforced with glass fibers to enhance strength and durability in the outer toothed part 210 and the inner toothed part 220.

By the present embodiments, in a worm wheel of a steering device reducer, it is possible to enable the reducer to be stably used for a long time by increasing the mechanical strength of the worm wheel and durability when high power is transferred to the steering shaft through the worm wheel from the worm shaft and increasing the formability and precision of the worm wheel.

Although it is described above that all of the components are combined into one or are operated in combination, embodiments of the disclosure are not limited thereto. One or more of the components may be selectively combined and operated as long as it falls within the scope of the objects of the embodiments.

When an element "comprises," "includes," or "has" another element, the element may further include, but rather than excluding, the other element, and the terms "comprise," "include," and "have" should be appreciated as not excluding the possibility of presence or adding one or more features, numbers, steps, operations, elements, parts, or combinations thereof. All the scientific and technical terms as used herein may be the same in meaning as those commonly appreciated by a skilled artisan in the art unless defined otherwise. It will be further understood that terms, such as those defined dictionaries, should be interpreted as having a meaning that is consistent with their meaning in the context of the relevant art and will not be interpreted in an idealized or overly formal sense unless expressly so defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This application claims priority to Korean Patent Application No. 10-2019-0108688 filed in the Korean Intellectual Property Office on Sep. 3, 2019, the disclosure of which is incorporated by reference herein in its entirety.

The invention claimed is:

1. A worm wheel of a steering device reducer, comprising:
   an outer toothed part having a ring shape provided with outer gear teeth engaged with gear teeth of a worm shaft on an outer circumferential side thereof and insertion recesses radially depressed and circumferentially spaced apart from each other on an inner circumferential side thereof and having a coupling hole in any one of an upper surface and lower surface thereof;
   an inner toothed part having a ring shape inserted into an inside of the outer toothed part and provided with insertion protrusions fitted into the insertion recesses, on an outer circumferential side thereof and a cylindrical coupling protrusion in a position corresponding to the coupling hole to be coupled to the coupling hole;
   a hub to which a steering shaft is coupled; and
   a boss part provided between an outer circumferential side of the hub and an inner circumferential side of the outer toothed part,
   wherein the outer toothed part has a support recess in an inner circumferential surface of a portion thereof connected with the insertion recesses.

2. The worm wheel of claim 1, wherein the inner toothed part has a support protrusion formed on an upper surface or lower surface adjacent to the inner circumferential surface to protrude upward to be inserted into the support recess.

3. The worm wheel of claim 2, wherein the support recess is formed in each of an upper side and lower side connected with the insertion recesses, wherein a plurality of support recesses are arranged to be circumferentially spaced apart from each other, and wherein the support protrusion is formed in a position corresponding to the support recess on each of an upper surface and lower surface adjacent to the inner circumferential surface of the inner toothed part.

4. A worm wheel of a steering device reducer, comprising:
   an outer toothed part having a ring shape provided with outer gear teeth engaged with gear teeth of a worm shaft on an outer circumferential side thereof and insertion recesses radially depressed and circumferentially spaced apart from each other on an inner circumferential side thereof and having at least one coupling hole in at least one of an upper surface and lower surface thereof;
   an inner toothed part having a ring shape inserted into an inside of the outer toothed part and provided with insertion protrusions fitted into the insertion recesses, on an outer circumferential side thereof and at least one cylindrical coupling protrusion protruding from at least one of an upper surface and lower surface of the inner toothed part in an axial direction and a position corresponding to the at least one coupling hole to be coupled to the at least one coupling hole;
   a hub to which a steering shaft is coupled; and
   a boss part provided between an outer circumferential side of the hub and an inner circumferential side of the outer toothed part,
   wherein the at least one coupling hole is formed in an arc shape, wherein the at least one coupling hole comprises a plurality of coupling holes arranged on the upper surface or lower surface to be spaced apart from each other, and wherein the at least one coupling protrusion is formed to protrude in an arc shape corresponding to the at least one coupling hole.

5. The worm wheel of claim 1, wherein an outer circumferential surface of the coupling protrusion and an inner circumferential surface of the coupling hole contact each other.

6. The worm wheel of claim 5, wherein an end of the coupling protrusion is positioned on a same plane as the upper surface or lower surface, provided with the coupling hole, of the outer toothed part.

7. The worm wheel of claim 1, wherein an end of the coupling protrusion is positioned on a same plane as the upper surface or lower surface, provided with the coupling hole, of the outer toothed part.

8. The worm wheel of claim 1, wherein an outer surface of the coupling protrusion and an inner surface of the coupling hole fit each other in contact.

9. The worm wheel of claim 1, wherein the coupling hole of the outer toothed part is formed in an upper or lower direction to communicate with the insertion recesses.

10. The worm wheel of claim 4, wherein the inner toothed part has a fixing protrusion formed, as an inclined surface, on at least one of an upper end and lower end of the inner circumferential surface, and wherein a plurality of fixing recesses circumferentially spaced apart from each other are formed in the fixing protrusion.

11. A method for manufacturing a worm wheel of a steering device, the method comprising:
   providing an outer toothed part having a ring shape provided with outer gear teeth engaged with gear teeth of a worm shaft on an outer circumferential side thereof and insertion recesses radially depressed and circumferentially spaced apart from each other on an inner circumferential side thereof and having at least one coupling hole in at least one of an upper surface and lower surface thereof;
   providing an inner toothed part having a ring shape inserted into an inside of the outer toothed part and provided with insertion protrusions fitted into the insertion recesses, on an outer circumferential side thereof and at least one cylindrical coupling protrusion protruding from at least one of an upper surface and lower surface of the inner toothed part in an axial direction and a position corresponding to the at least one coupling hole to be coupled to the at least one coupling hole;
   coupling a steering shaft to a hub; and
   providing a boss part between an outer circumferential side of the hub and an inner circumferential side of the outer toothed part,
   wherein the at least one coupling hole is formed in an arc shape, wherein the at least one coupling hole comprises a plurality of coupling holes arranged on the upper surface or lower surface to be spaced apart from each other, and wherein the at least one coupling protrusion is formed to protrude in an arc shape corresponding to the at least one coupling hole.

12. The method of claim 11, wherein an outer circumferential surface of the coupling protrusion and an inner circumferential surface of the coupling hole contact each other.

13. The method of claim 12, wherein an end of the coupling protrusion is positioned on a same plane as the upper surface or lower surface, provided with the coupling hole, of the outer toothed part.

14. The method of claim 11, wherein an end of the coupling protrusion is positioned on a same plane as the upper surface or lower surface, provided with the coupling hole, of the outer toothed part.

15. The method of claim 11, wherein an outer surface of the coupling protrusion and an inner surface of the coupling hole fit each other in contact.

16. The method of claim 11, wherein the coupling hole of the outer toothed part is formed in an upper or lower direction to communicate with the insertion recesses.

17. The method of claim 11, wherein the outer toothed part has a support recess in an inner circumferential surface of a portion thereof connected with the insertion recesses.

18. The method of claim 11, wherein the inner toothed part has a fixing protrusion formed, as an inclined surface, on at least one of an upper end and lower end of the inner circumferential surface, and wherein a plurality of fixing recesses circumferentially spaced apart from each other are formed in the fixing protrusion.

\* \* \* \* \*